US009933136B2

(12) United States Patent
Anselm et al.

(10) Patent No.: US 9,933,136 B2
(45) Date of Patent: Apr. 3, 2018

(54) LIGHTING APPARATUS HAVING A PERFORATED PANEL

(71) Applicant: Bartenbach Holding GmbH, Aldrans (AT)

(72) Inventors: Christian Anselm, Wattens (AT); Christian Reisecker, Fulpmes (AT)

(73) Assignee: BARTENBACH HOLDING GMBH, Aldrans (AT)

( * ) Notice: Subject to any disclaimer, the term of this patent is extended or adjusted under 35 U.S.C. 154(b) by 76 days.

(21) Appl. No.: 15/258,754

(22) Filed: Sep. 7, 2016

(65) Prior Publication Data

US 2017/0067621 A1   Mar. 9, 2017

(30) Foreign Application Priority Data

Sep. 7, 2015 (DE) .................. 10 2015 011 714

(51) Int. Cl.
*F21V 7/09* (2006.01)
*F21V 5/04* (2006.01)
(Continued)

(52) U.S. Cl.
CPC .............. *F21V 14/02* (2013.01); *F21S 8/026* (2013.01); *F21V 5/045* (2013.01); *F21V 5/048* (2013.01);
(Continued)

(58) Field of Classification Search
CPC .......... F21V 5/045; F21V 5/048; F21V 11/08; F21V 11/14; F21V 7/0016; F21V 7/0091
See application file for complete search history.

(56) References Cited

U.S. PATENT DOCUMENTS

2011/0182065 A1    7/2011  Negley et al.
2012/0300469 A1*  11/2012  Jorgensen ............... F21V 5/008
                                                    362/327

(Continued)

FOREIGN PATENT DOCUMENTS

DE    102007040573 A1    5/2009
DE    102009017495 A1   12/2010
EP         2031296 A1    3/2009

OTHER PUBLICATIONS

German Search Report for priority DE application dated May 4, 2016, 12 pages.

(Continued)

*Primary Examiner* — Karabi Guharay
(74) *Attorney, Agent, or Firm* — Troutman Sanders LLP; Ryan A. Schneider; Christopher Close, Jr.

(57) ABSTRACT

A lighting apparatus, in particular in the form of ceiling spots, with a perforated panel having at least one aperture for light to pass through, as well as a lens arranged so as to be concealed behind the perforated panel to emit a bundle of light beams that narrows on its way from the lens to the perforated panel, passes through the aperture for light to pass through, and broadens again after leaving the perforated panel. The lens is shaped in such a manner that a direct beam portion and/or direct light portion emitted without reflection from the lens and an indirect beam portion and/or indirect light portion emitted with reflection from the lens have essentially identical beam angles, and each essentially completely make up and/or fill out the overall bundle of light beams emitted by the lens.

22 Claims, 6 Drawing Sheets

(51) Int. Cl.
*F21V 11/14* (2006.01)
*F21V 14/02* (2006.01)
*G02B 19/00* (2006.01)
*F21V 7/00* (2006.01)
*F21W 121/00* (2006.01)
*F21Y 115/10* (2016.01)
*F21Y 113/13* (2016.01)
*F21Y 113/17* (2016.01)
*F21S 8/02* (2006.01)

(52) U.S. Cl.
CPC .......... *F21V 7/0016* (2013.01); *F21V 7/0091* (2013.01); *F21V 11/14* (2013.01); *G02B 19/0028* (2013.01); *G02B 19/0066* (2013.01); *F21S 8/024* (2013.01); *F21W 2121/008* (2013.01); *F21Y 2113/13* (2016.08); *F21Y 2113/17* (2016.08); *F21Y 2115/10* (2016.08)

(56) References Cited

U.S. PATENT DOCUMENTS

| | | | |
|---|---|---|---|
| 2012/0320102 A1 | 12/2012 | Jorgensen | |
| 2013/0058103 A1* | 3/2013 | Jiang | F21V 5/04 362/296.05 |
| 2014/0316742 A1* | 10/2014 | Sun | G02B 19/0066 702/167 |

OTHER PUBLICATIONS

Extended European Search Report for Application No. EP 16185594.5 dated Dec. 9, 2016, 6 pages.

* cited by examiner

LIGHTING APPARATUS HAVING A PERFORATED PANEL

CROSS-REFERENCE TO RELATED APPLICATIONS

This application claims the benefit of German Utility Model Application No. DE 10 2015 011 714.9 filed 7 Sep. 2015, the entire contents and substance of which are hereby incorporated by reference.

BACKGROUND OF THE INVENTION

1. Field of Invention

The present invention relates to a lighting apparatus, in particular in the form of ceiling spots, with a perforated panel having at least one aperture for light to pass through, as well as a lens arranged to as to be concealed behind the perforated lens to emit a bundle of light beams that narrows on its way from the lens to the perforated panel, passes through the aperture for light to pass through, and broadens against after leaving the perforated panel.

2. Background and Related Art

Such a lighting apparatus is known from EP 20 31 296 A1, and is sometimes known as a recessed spotlight. In this apparatus, lighting means are covered by flat coverings in the form of perforated panels and arranged such as to be invisible to the human eye, where the aforementioned perforated panels may form a wall or ceiling covering, e.g. in the manner of a suspended ceiling. In order for the light produced by the lighting means to be emitted through the relatively small apertures for light to pass through, lenses are provided for the lighting means that capture the light emitted from the lighting means and bundle it into a roughly hourglass-shaped bundle of light beams, which narrows on its way from the light emitting surface of the lens to the perforated panel to the point that it is able to pass through the aperture for light to pass through, and broadens again after passing through the aperture on the front side of the perforated panel. As a result, the apertures for light to pass through can be kept very small in order to conceal from view the lenses and lighting means, which can be arranged spaced at a distance from the back side of the perforated panel, and prevent a glaring effect from looking directly into the lighting means.

Due to the limited space available behind the perforated panel—minimizing the distance to the ceiling or wall behind it is intended to also minimize the ceiling height or room volume lost—and the often dense, grid-like array of multiple apertures for light to pass through, the lenses must be of a compact design. As the diameter of the apertures for light to pass through must also be very small, which requires the precise capture of the bundle of light beams and an exact alignment of the bundle of light beams toward the aperture for light to pass through, the lenses mentioned below have thus far been sensitive in terms of the positioning of the lighting means relative to the light entering interface of the lenses. Manufacturing tolerances when installing the lenses on the lighting means, usually in the form of LEDs, can result in an irregular, patchy radiation field with areas of light and darkness and color shifts, and consequently to a correspondingly uneven illumination of the room. Similar problems may also arise due to manufacturing tolerances during production of the lenses, which can result in irregularities in the form of the lenses themselves.

Such installation and manufacturing tolerances may occur in particular when commercially available standard LED components are used which already have a dome-shaped primary lens over the chip, or may be exposed or overmolded LED chips, and are themselves quite inexpensive, but must subsequently be mounted on the lenses functioning as secondary lenses, by means of which the light is formed into a bundle of light beams that fits through the apertures in the perforated panel for light to pass through in the manner described. Furthermore, the low price of such LED components is often accompanied by a need to work with different types of LEDs from different manufacturers for different illumination tasks, depending on the intended use and application and perceptual psychology requirements or simply at the behest of client, e.g. in order to attain a specific luminous color or color temperature in the room lighting. In particular, positioning tolerances may occur that displace the LED chips off-center to the central axis of the lens or away from the theoretically ideal set point and amplify the abovementioned problems of uneven light propagation, a patchy radiation field with light and dark areas, and color shifts.

Given the above, the problem addressed by the present invention is the creation of an improved lighting apparatus of the type stated above which avoids the drawbacks of the prior art and advantageously develops it further. In particular, even room lighting is to be achieved with an arrangement of lenses less challenging in terms of its manufacture and installation, which nonetheless, despite the challenging installation environment behind a perforated panel with narrow apertures for light to pass through, enables simple adjustment of luminous color or color temperature as desired while maintaining even illumination and using standard lighting means.

BRIEF SUMMARY OF THE INVENTION

Briefly described, in a preferred form, the present invention comprises a lighting apparatus, in particular in the form of ceiling spots, with a perforated panel having at least one aperture for light to pass through, as well as a lens arranged to as to be concealed behind the perforated lens to emit a bundle of light beams that narrows on its way from the lens to the perforated panel, passes through the aperture for light to pass through, and broadens against after leaving the perforated panel.

It is thus suggested that the bundle of light beams passing through an aperture for light to pass through in the perforated panel no longer be generated by a single light source, but that the light from a plurality of light sources be bundled, and this mixed beam projected through the aperture for light to pass through in the perforated panel. In order to achieve even mixing in the bundle of light beams and avoid patchy lighting with areas of uneven brightness or localized variations in color or color temperature, the lens emits unreflected direct light components and reflected indirect light components that largely overlap.

In accordance with the invention, a plurality of light sources are allocated to a common lens, their light captured by the common lens, and, in the form of the abovementioned bundle of light beams that narrows on its path from the lens to the perforated panel, passes through an aperture for light to pass through, and broadens as it leaves the perforated panel, where the abovementioned lens is shaped in such a manner that a direct beam portion and/or direct light portion emitted without reflection from the lens and an indirect beam portion and/or indirect light portion emitted with reflection from the lens have essentially identical beam angles, and each essentially completely make up and/or fill out the overall bundle of light beams emitted by the lens.

In particular, the aforementioned indirect beam portion, the beams of which can be reflected off the lens mantle surface, can also make up and/or fill out or irradiate the central area of the bundle of light beams, so that the indirect beam portion no longer has a central hole or cavity. Conversely, the direct beam portion not reflected from the lens can also be expanded to the peripheral areas of the bundle of light beams so that the direct beam portion is not concentrated solely in the central region of the bundle of light beams. The indirect beam portion and the direct beam portion of the lens each irradiate essentially the entire radiation field, as they have essentially identical radiation fields. This can significantly reduce sensitivity with regard to manufacturing tolerances and light sources positioned off-center without impairing the uniformity of the room lighting.

The abovementioned radiation angle refers to the angle of the limiting rays of the direct beam portion in relation to each other and/or the angle of the limiting rays of the indirect beam portions in relation to each, where the aforementioned limiting rays are the most expanded rays. The limiting rays of the direct beam portion and the limiting rays of the indirect beam portion are thus approximately parallel to one another.

In order to be less constrained by the color or color temperature of a given light source, the light sources allocated to a common lens may have different luminous colors and/or color temperatures. For example, a cold white light source can be combined with a warm white light source in order to generate an overall neutral white bundle of light beams. Alternatively or in addition, warm white and neutral white or neutral white and cold white or warm white, neutral white, and cold white light sources together can be allocated to a lens together in order to mix or generate desired white color temperatures. Depending on the lighting task and desired room ambience, other luminous colors and/or white light color temperatures can be mixed together or light sources combined with one another, e.g. to cancel out deficits of individual light sources.

In particular, red, yellow, and blue light sources, e.g. in the form of an RGB lighting means, and/or red, yellow, blue, and white light sources, e.g. in the form of an RGBW lighting means, may be provided. However, light sources of other colors such as cyan, lime, or orange may also be provided, as well as other shades, in combination with one another or with one or more of the aforementioned luminous colors. Alternatively to light sources of various luminous colors and/or color temperatures, multiple light sources of the same luminous color or color temperature may also be used, e.g. to achieve different levels of luminous intensity or compensate for the loss or failure of individual light sources.

In an advantageous further development of the invention, a control apparatus for the variable controlling of the relationship of the outputs emitted by the various light sources to one another may be provided in order to obtain a desired luminous color or color temperature when light sources of different luminous colors or color temperatures or used, and/or, if light sources of the same color are used, to be able to dim the output or compensate for the loss or failure of one light source by boosting another light source. Such a control apparatus can simply turn on and turn off e.g. one light source in order to add their light to that emitted by the other light source. A multi-stage adjustment or continuous dimming of the output or luminosity of at least one, and in particular also all of the plurality of light sources allocated to a lens can also advantageously be realized by the control apparatus. By this means, a more finely graduated or even continuously variable variation of the overall luminous intensity emitted and/or the emitted luminous color or color temperature of the bundle of light beams can be achieved.

In order to achieve a given room lighting with a simultaneously high degree of homogenization of the light in the bundle of light beams, the aforementioned beam angle of the direct light portion and the indirect light portion may be selected so as to each be in a range of from $2 \times 10°$ to $2 \times 50°$, preferably also $2 \times 20°$ to $2 \times 40°$, wherein the lenses can preferably be shaped in particular so that the beam angles are each approximately $2 \times 35°$, i.e. the direct light portion and the indirect light portion each broaden after emerging from the perforated panel at an angle of approximately 70°.

In order to achieve the desired high level of homogenization of the light portions while simultaneously retaining a compact installation size, and thus installability in the limited space available for installation behind the perforated panel, the lens can be shaped in a further development of the invention such that the bundle of light beams generated by the lens has a necking degree and/or constriction ratio within a range of 1.4 to 2.5, where the necking degree describes the ratio of the diameter of the bundle of light beams at the light-emitting surface of the lens to the minimum diameter of the bundle of light beams occurring in the region of the aperture in the perforated panel. The diameter of the bundle of light beams in the area of the light-emitting surface of the lens can essentially correspond to the maximum photometrically effective lens diameter of the lens edge areas and mounting flange, etc. not considered. The necking degree can thus also be understood as the ratio of the maximum photometrically effective lens diameter to the diameter of the bundle of light beams in the area of its greatest necking and/or in the area of the aperture for light to pass through in the perforated panel, or to the minimum diameter of the bundle of light beams.

The necking degree is preferably in the region of 1.6 to 2.2.

In an advantageous further development of the invention, the lens may have a light emitting surface divided into at least two main areas, of which a first main area serves to emit the direct beams, i.e. the beams not already reflected from the lens, and the second main area serves to emit the indirect beams, i.e. the already reflected beams. The first main area of the light emitting surface from which the direct beams are emitted can preferable be located within the second main area, and in particular may form the central region of the lens.

The direct beams may also be refracted or diffracted, in particular when entering the lens at an e.g. slightly curved light entry surface, and/or when leaving the lens at an e.g. also slightly curved light emission surface, where the direct beams can be in particular the beams passing through the central lens region, which are guided from the central lens entry surface section directly to a central lens emission surface section, without the direct beams being reflected off the lens mantle surface, in particular completely reflected.

By contrast, the indirect beams can expanded at a corresponding light entry surface section to such a degree that the reach the mantle surface of the lens and are reflected there, in particular completely reflected, before reaching the light emission surface, possible after reflecting again off an opposite mantle surface, and in particular a different light emission surface section than the aforementioned direct beams.

In a further development of the invention, the first main section for emitting the direct beams can have a convex curvature and/or a flat, dome-shaped contour. The convex curvature of the central main section of the lens can have a smaller curvature radius than the other main section of the lens from which the indirect beams are emitted.

The second main section of the light emitting surface from which the indirect beams are emitted can form a toroidal, raised annular surface surrounding the abovementioned first main section. Due to the aforementioned convex or dome-shaped curve of the first main section, the direct beams can also be expanded in the marginal areas of the total emitted light beam and thus fill up the total bundle of light beams. Due to the raised, annular contour of the second main section, which declines again toward the first main section in the center, the indirect beams can also be distributed in the core region of the total emitted bundle of light beams, so that an essentially complete overlap of the direct and indirect beam portions can be achieved.

Depending on the shape of the mantle surface and/or the light entry surface, however, other shapes for the light emitting surface may be provided.

In order to achieve further mixing and greater lack of sensitivity with regard to the arrangement of the light sources relative to the lens, the lens may be provided with faceting on at least one side of its surface in an advantageous further development of the invention, where, in an advantageous further development of the invention, the light emitting surface in particular may be provided with such faceting. This faceting may extend across a single, or in particular also across both main sections of the light emitting surface. Such faceting may—in addition or alternatively to the faceting of the light emitting surface—also be provided on the light entry surface and/or the mantle surface of the lens.

This faceting may be comprised of a plurality of small surfaces—the faceted surfaces—where e.g. 25 or more, preferable more than 50 or more than 100 such faceted surfaces may be provided on the light emitting surface or the respective lens surface, where the facets may be arranged on the respective lens surface in several rings or rows, e.g. three, five, or more rings or rows, each having a plurality of facets, e.g. six, twelve, or more.

The faceted surfaces may form flat surface portions, or be formed essentially flat. Alternatively, convex faceted surfaces may also be provided, which may correspond e.g. to the imprints of flat lenses or spherical imprints, such that a generally bulged or indented surface structure comprising a plurality of small indentations is obtained. Mixed forms of such faceting comprising flat and/or convex and/or concave faceted surfaces may also be used.

In a further development of the invention, the lighting apparatus may have not only a single aperture in the perforated panel for light to pass through, but a plurality of such apertures, where a plurality of perforated panels each with one or more apertures for light to pass through may also be arranged next to one another in a single plane, or tangentially to a common enveloping surface. The perforated panel(s) may be essentially flat or curved along one or two axes, e.g. in order to be adapted for use with a barrel-vaulted ceiling, an arched wall, etc. In particular, the at least one perforated panel may have a plurality of apertures for light to pass through, which may be arranged in a row or rows, in particular in the form of a matrix.

With such a distributed arrangement of multiple apertures for light to pass through, the plurality of light sources allocated to an aperture for light to pass through may be provided in arrangements differing from one another, in particular rotated relative to one another. This rotation may be in particular with regard to an axis of rotation perpendicular to the perforated panel, in particular with regard to the whole axis running through the relevant aperture for light to pass through. In particular, the light source arrays on adjacent apertures for light to pass through of the perforated panel may each be rotated with regard to each other by a particular amount.

If one regards the apertures for light to pass through in the direction of their hole axis—i.e. in particular in a perspective perpendicular to the perforated panel—two light sources may be arranged at a first aperture for light to pass through e.g. at twelve o'clock and six o'clock, while for a second aperture for light to pass through, which may be adjacent to the first aperture for light to pass through, two light sources may be arranged at three o'clock and nine o'clock.

Depending on the number of light sources allocated to an aperture for light to pass through or lens, other rotations may of course also be provided. If, e.g., three light sources are allocated to one lens, light sources may be arranged at a first hole of the perforated panel at twelve o'clock, four o'clock, and eight o'clock. At a second aperture for light to pass through, on the other hand, light sources may be arranged at twelve o'clock, four o'clock, and eight o'clock, but in a different distribution than at the first aperture for light to pass through. If, for example, a blue light source is located at twelve o'clock at the first aperture for light to pass through, a yellow light source at four o'clock, and a white light source at eight o'clock, in the case of the second aperture for light to pass through, the white light source may be positioned at twelve o'clock, the blue light source at four o'clock, and the yellow light source at eight o'clock.

Alternatively or in addition to such a rotation of equivalent arrays, differing arrangements of light sources may be provided for adjacent apertures for light to pass through, e.g. an arrangement of three light sources next to an arrangement of two or four lights, or an arrangement of light sources with two white and two yellow light sources next to an arrangement of light sources with one white and three yellow light sources.

Through such an arrangement of the light sources rotated relative to one another on the principle of a revolver, and/or through arrangements of light sources differing from one another in terms of the number or color of the light sources, an overall further improved homogenization of the room lighting can be achieved, in particular if the plurality of apertures for light to pass through is provided, e.g. at least 4, 16, 64, or more apertures for light to pass through in a regular matrix array, which may comprise one or more rows and one or more columns.

In principle, however, a single point arrangement may be provided, in which the perforated panel of the lighting apparatus has only a single aperture for light to pass through. Such a single-point arrangement may serve e.g. as a downlight, or the lighting apparatus may be embodied as a single spot downlight. A plurality of light sources may also be allocated to the lens; these may be of different colors or the same color, in order to mix the desired luminous color or desired white light color, change the luminous color or color temperature by switching on or off individual colors, or, in the case that only one color is used, to select the luminosity or compensate for the loss or failure of a single light source.

The plurality of light sources allocated to a common lens, in particular in the form of a plurality of LEDs, may be embodied in different ways. For example, the plurality of light sources may comprise separate, individual LED components, potentially with separate power supplies, each light source comprising an LED component capable of functioning fully independently. Alternatively, the plurality of light sources allocated to a lens may also form a package of light sources, in the sense of a preassembled or premanufactured light source assembly. In particular, a multichip LED assembly may be used in which a plurality of LED chips are attached to a common substrate, e.g. a common supply plate, where the individual LED chips may have the same color or different colors.

Alternatively or in addition, the lens may also have marginal surfaces of differing shapes on its light entry surface. In a further development of the invention, the lens has a marginal surface section in a central light entry region that is convexly curved toward the light source, which captures the centrally emitted light and directs it at least approximately parallel toward the light emitting surface of the lens. To capture the luminous flux emitted more laterally, the lens may also have a preferably conical or funnel-shaped exterior light entry surface which directs the light to a lateral exterior contour or the mantle surface of the lens. This exterior contour or mantle surface of the lens is preferably embodied so as to be reflective, in particular completely reflective, so that the luminous flux is reflected back into the lens body. Preferably, the fully reflective exterior contour is shaped such that the luminous flux is directed toward the light emitting side of the lens, in particular to the aforementioned exterior, convexly shaped marginal surface area of the light emitting side of the lens.

Depending on the lighting means used, the lens may have varying geometrical dimensions. If a standard LED is used, the lens can have a maximum diameter of 10 to 25 mm, preferably within a range of 14 to 20 mm. The maximum diameter is preferably within the range of the light emitting side of the lens, and may be in particular approximately 16-17 mm.

The lens is preferably designed so as to be very vertically compact. It may have a length in the range of 10 to 20 mm, preferably 12 to 15 mm.

In order to permit easy installation, the lights or lenses may be joined with the panel to form a modular assembly. Alternatively, however, the lighting means and the lenses may also be attached to the wall or ceiling or other support independently of the perforated panel. This may be advantageous in particular if the lighting means on the one hand and the aperture for light to pass through on the other are arranged in grid patterns congruent with one another, in particular regular grid patterns, such that a simple congruent superimposing of the panel is possible.

In an advantageous further development of the invention, the lights with the lenses may be attached to a light carrier, preferably in the form of a circuit board. This circuit board may contain the control and/or power electronics for controlling and operating the lights.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
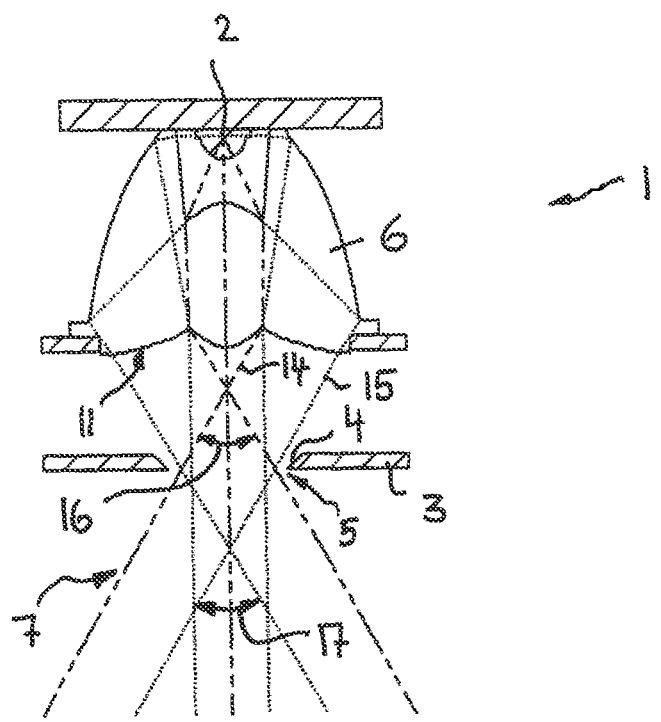
FIG. 1 is a sectional view of a lighting apparatus in accordance with an advantageous embodiment of the invention, where, in a partial view, only a single aperture for light to pass through the perforated panel and the lens allocated to this aperture for light to pass through are shown, where the indirect and direct beam portions and their path in the lens and in the emitted bundle of light beams are shown.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The lighting apparatus 1 depicted schematically in FIG. 1 comprises one or a plurality of groups of light sources or lighting means 2, preferably in the form of LEDs, each of which—combined into a group—comprises a plurality of light sources, and are preferably arranged in a regular grid pattern at a distance to one another. FIG. 1 shows only a single group of lighting means 1, the light from which is emitted entirely into a half-space oriented downward, in accordance with FIG. 1.

Allocated to the light sources or lighting means 2 is a perforated panel 3, which is preferably embodied in the form of a wall and/or ceiling cladding panel, and can be installed in the manner of a superimposed wall cladding or a suspended ceiling. The perforated panel 3 may be embodied in the form of a flat panel, e.g. a wooden panel or a panel of composite construction.

The perforated panel 3 has apertures for light to pass through 4, which are allocated to the groups of light sources or lighting means 2 and are arranged in a grid pattern corresponding to the arrangement of the lighting means 2. If embodied as a single light, the perforated panel 3 may alternatively also have only a single aperture for light to pass through 4, e.g. if the lighting apparatus is to be employed as a single downlight or single spot.

As shown in FIG. 1, the lighting means 2 on the non-visible back side of the perforated panel 3 are located at a significant distance from the apertures for light to pass through 4. Between the group of lighting means 2 drawn in FIG. 1, which comprises two lighting means 2 in the form of two LEDs, and the perforated panel 3 or its aperture for light to pass through 4, a lens 6 is arranged in accordance with FIG. 1; this lens bundles the light emitted into the half-space by the lighting means 2 and conducts it through the aperture for light to pass through 4, which would otherwise be too small. In particular, the lens 6 essentially completely takes up the luminous flux emitted by the group of lighting means 2 and emits it again completely; in particular, the lens 6 bundles the luminous flux emitted by the lighting means 2 with the aid of a necking 5 of the bundle of light beams 7 through the aperture for light to pass through 4 of the panel 3, see FIG. 1.

Figure 2:
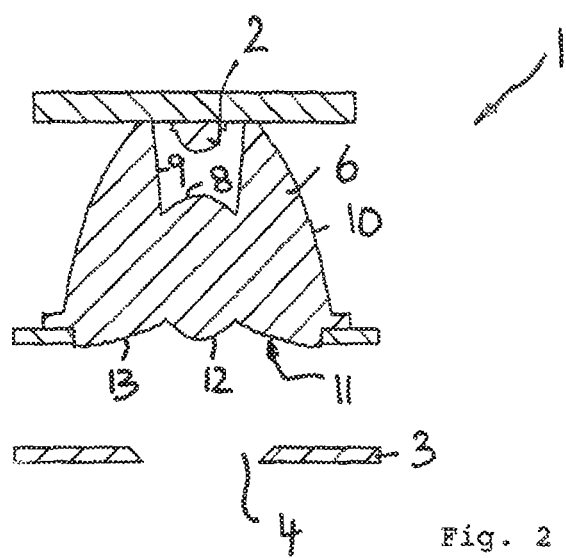
FIG. 2 is a sectional view of the lens of FIG. 1, which makes clear the contour of the lens without beam paths.

The lens 6 preferably has the form shown in the figures. On the light entry side, the lens 6 has a roughly blind hole or trough-shaped light entry recess, with which the lens 6 is fitted over or onto the lighting means 2, see FIG. 2. This light entry recess has, in a central, frontal area, an entry interface 8 curved convexly toward the lighting means 2 which captures the portion of light emitted upward and first directs it upward in parallel inside the lens body. The marginal surface is formed by the transition from one medium, e.g. air with an index of refraction of 1.0, to a second medium having a different index of refraction, e.g. PMMA, with an index of refraction of approximately 1.5. Laterally, the aforementioned light entry area is bordered by a conical or funnel-shaped marginal surface 9, which, viewed in cross-section, widens with sloped and/or curved flanks toward the lighting means, and refracts the light beams emitted more laterally and directs them toward the exterior 10 or mantle surface of the lens 6, see FIGS. 1 and 2.

The aforementioned exterior or mantle surface 10 is preferably embodied so as to be completely reflective and/or mirrored, so that the light beams reaching the exterior surface 10 are reflected, namely to the light emitting side 11 of the lens 6.

This light emitting side 11 of the lens 6 is subdivided substantially into two differently formed marginal surface sections. A first, central marginal surface 12, which forms the aforementioned first main section of the light emitting side, is curved in a convex or domelike manner. The light beams that entered the lens body through the central entry interface 8 and were radiated downward essentially in parallel in accordance with FIG. 2 reach this central interface 12. This central, slightly convex marginal surface 12 is supplemented on the light emitting side 11 by a raised, annular, convex second marginal surface 13, which refracts the light beams coming from the exterior 10 of the lens 6 and forms the second main section of the light emitting surface 11 mentioned above.

Figure 4:
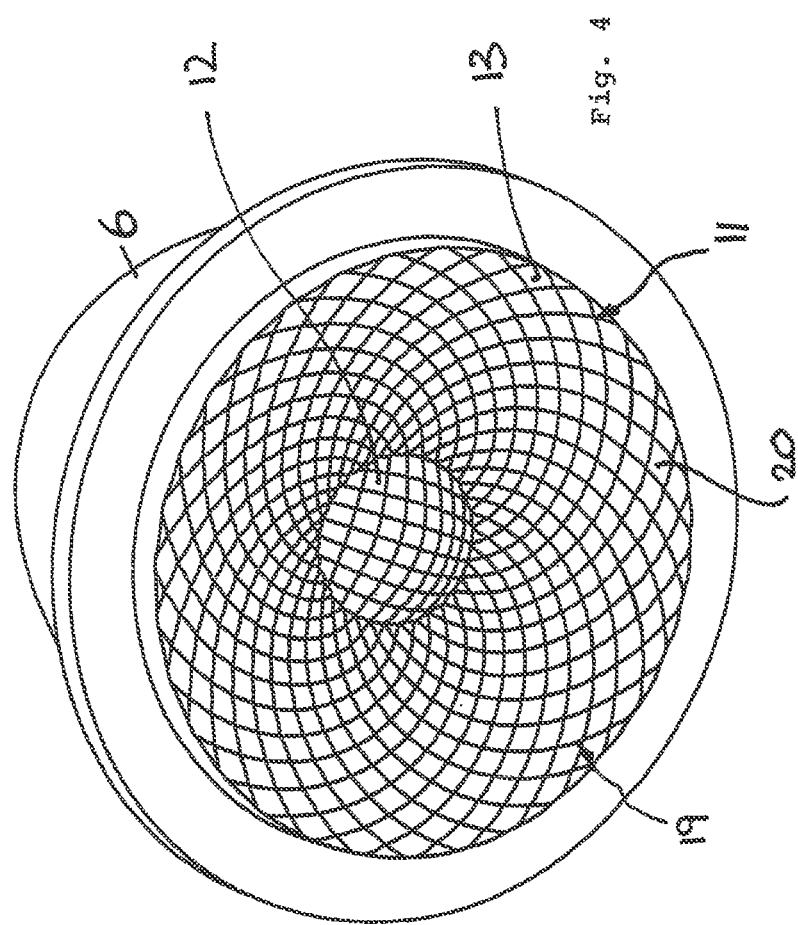
FIG. 4 is a frontal view in perspective of the light emitting surface of the lens of the preceding figures, showing the faceted surfaces of the two main sections of the light emitting surface.

The light emitting surface may, as shown in FIG. 4, be provided with a faceted surface 19, which may extend across the first and second main sections, or may be embodied in each of these sections or in only one of them. The faceted surface 19 may be comprised of a plurality of small surfaces—the facets 20—where e.g. more than 100 such facets may be provided on a given light emitting surface 11, where the facets may be arranged in a plurality of rings or rows in spiral form, each of which has a plurality of facets 20.

Figure 3:
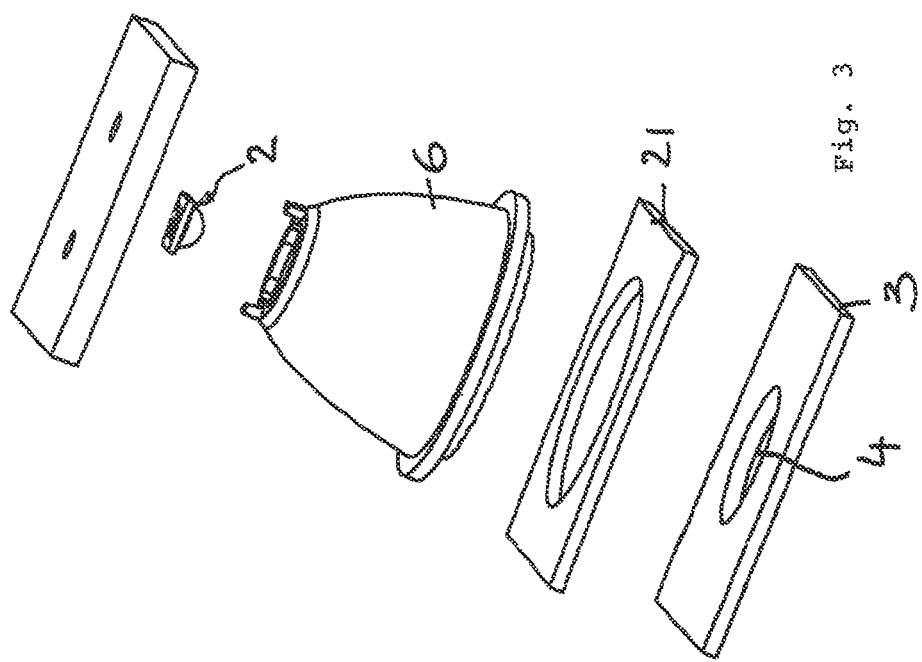
FIG. 3 is an exploded view in perspective of the components of the lighting apparatus of the preceding figures.

As FIG. 3 shows, the lighting means 2 and the lenses 6 may be joined with the perforated panel 3 to form a modular assembly. Alternatively, the lighting means 2 and the lenses 6 may also be mounted independently of the perforated panel 3 on the wall or ceiling or an additional support, which can then be attached to the wall or ceiling and/or joined with the perforated panel 3 to form a modular assembly.

Figure 5:
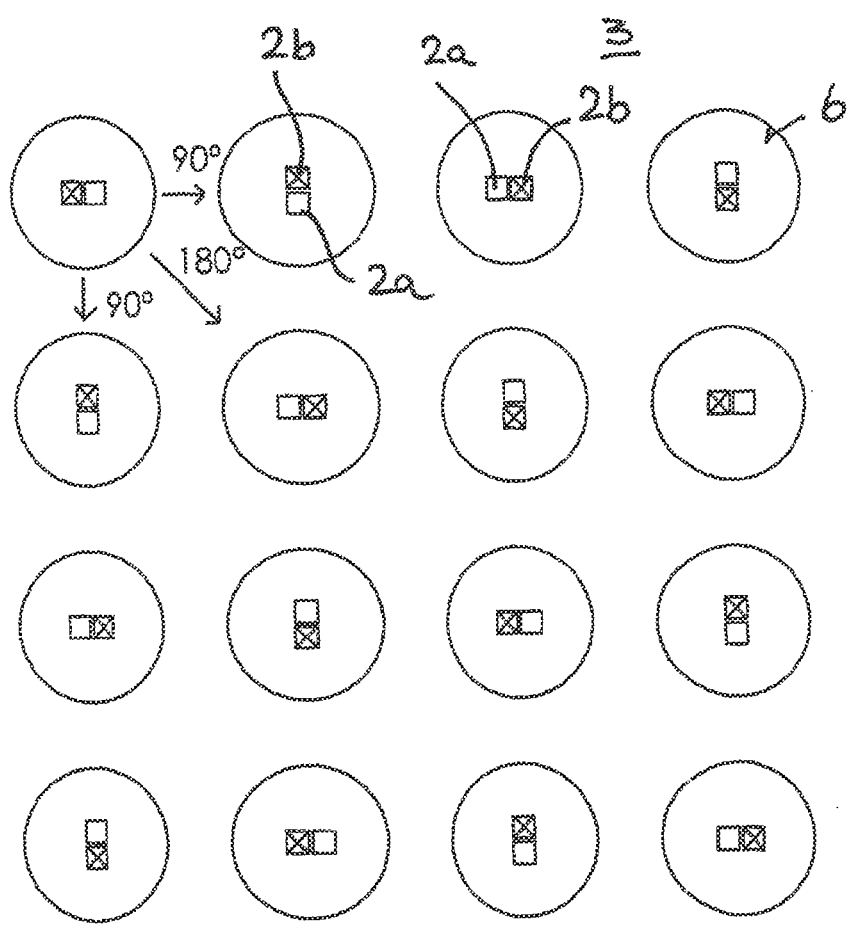
FIG. 5 is a schematic plan view of a perforated panel with recesses for light to pass through arranged in matrix form, showing the arrangement of the light sources rotated relative to one another in the case of an array with two light sources.
Figure 6:
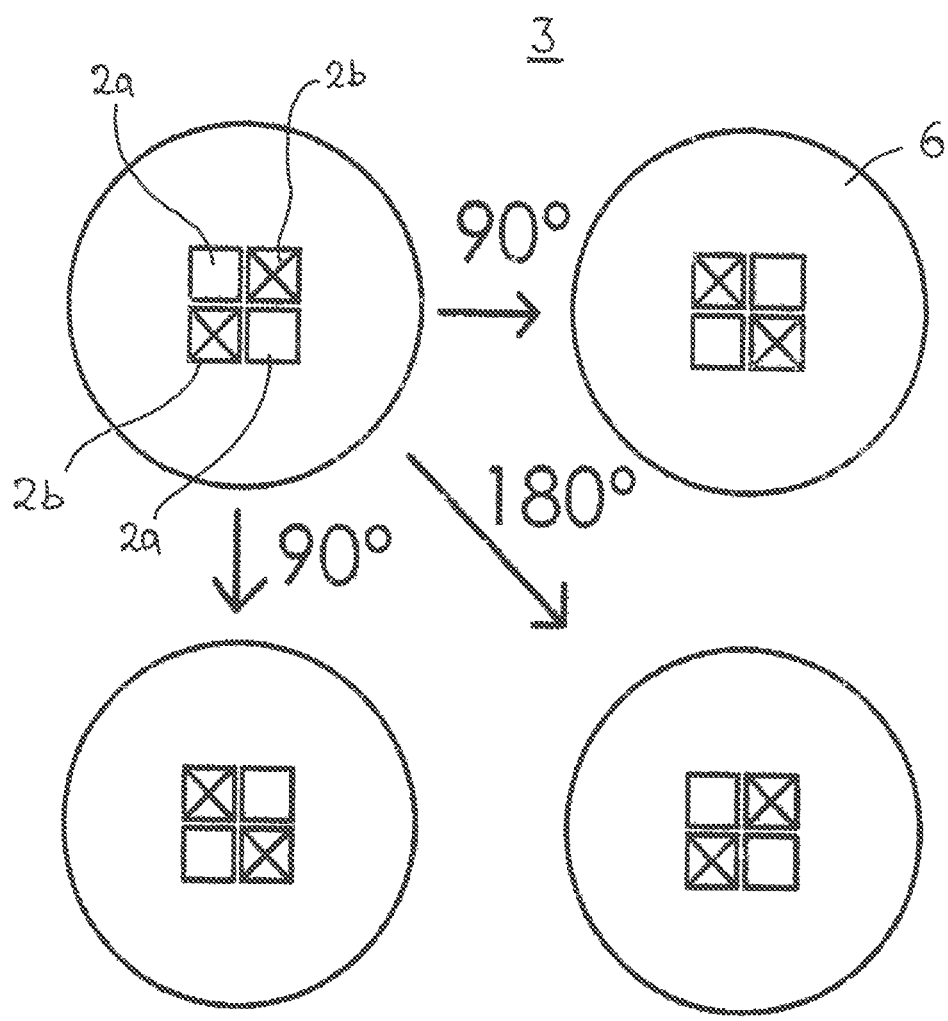
FIG. 6 is a schematic plan view of the lighting apparatus similar to FIG. 5, showing the arrangement of the light sources rotated relative to one another at various apertures for light to pass through in the case of an array with four light sources.

As FIGS. 5 and 6 most clearly show, the bundle of light beams 7 passing through a particular aperture for light beams to pass through 4 in a perforated panel 3 is generated no longer only by a single light source, but instead the light from a plurality of light sources 2a and 2b, which are combined into a group of light sources 2 and allocated to a common lens 6, is combined, mixed, and allowed to pass through the aperture for light to pass through 4 in the perforated panel 3. In order to achieve even mixing in the bundle of light beams and avoid patchy lighting with areas of uneven brightness or localized variations in luminous color or color temperature, the lens 6 emits unreflected direct light components 14 and reflected indirect light components 15 that essentially overlap completely, as shown in FIG. 1.

A plurality of light sources 2a and 2b in the form of LEDs preferably of different colors are allocated to the common lens 6, the light from which is captured by the common lens 6 and, in the form of the aforementioned bundle of light beams 7 that narrows on its path from the lens 6 to the perforated panel 3, passes through an aperture for light to pass through 4 and broadens as it leaves the perforated panel 3. These LEDs may be arranged adjacent to one another in a common plane perpendicular to the main axis of the lens 6, or in different planes or slightly offset in an axial direction, where the LEDs may in particular be housed in the aforementioned light emitting recess of the lens 6. This lens 6 is shaped in such a manner that a direct beam portion 14 emitted without reflection from the lens 6 and an indirect beam portion 15 emitted with reflection from the lens have essentially identical beam angles 16 and 17, and each essentially completely make up and/or fill out the overall bundle of light beams emitted by the lens, see FIG. 1.

In particular, the aforementioned indirect beam portion 15, the beams of which can be reflected off the lens mantle surface 10, can also make up and/or fill out or irradiate the central area of the bundle of light beams, so that the indirect beam portion 15 no longer has a central hole or cavity. Conversely, the direct beam portion 14 not reflected from the lens 6 can also be expanded to the peripheral areas of the bundle of light beams 7 so that the direct beam portion 14 is not concentrated solely in the central region of the bundle of light beams.

The specified beam angles may be at least approximately 2×35°, see FIG. 1.

As it is shown by FIG. 1, the lens 6 can be shaped such that the bundle of light beams 7 generated by the lens 6 has a necking degree within a range of approximately 1.4 to 2.5, where the necking degree describes the ratio of the diameter of the bundle of light beams D at the light-emitting surface 11 of the lens 6 to the minimum diameter of the bundle of light beams d occurring in the region of the aperture in the perforated panel 3. The diameter of the bundle of light beams D in the area of the light-emitting surface of the lens can essentially correspond to the maximum photometrically effective lens diameter of the lens edge areas and mounting flange, etc. not considered. The necking degree is preferably in the region of 1.9 to 2.1.

As it is shown by FIGS. 5 and 6, the plurality of light sources allocated to an aperture for light to pass through are provided in arrangements which differ from one another, in particular which are rotated relative to one another, in terms of comparing adjacent or generally different apertures for light to pass through 4. This rotation may be in particular with regard to an axis of rotation perpendicular to the perforated panel 3, in particular with regard to the hole axis passing through the associated aperture for light to pass through 4. In particular, the light source arrays on adjacent apertures for light to pass through 4 of the perforated panel 3 may each be rotated with regard to each other by a particular amount.

Depending on the number of light sources 2 combined in a group of light sources 2 (and allocated to a common lens 6), various rotations or angles of rotation may be desirable.

As FIG. 5 shows, in the case of an array with two light sources, namely 2a and 2b—in particular in the form of the abovementioned LEDs—an angle of rotation of 90° between two adjacent apertures for light to pass through of a row of apertures for light to pass through 4 and/or an angle of rotation of 90° between two adjacent apertures for light to pass through of a column of apertures for light to pass through 4 may be provided for each aperture for light to pass through 4, where a single or multi-row and/or a single or multi-column matrix array may be provided. The light sources 2a and 2b of a group of light sources may be light sources of different colors—e.g. cold white and warm white LEDs.

As FIG. 5 makes clear, such a 90° rotation between two adjacent groups of light sources 2 may be advantageous in particular in the case of a matrix array of at least 4×4 apertures for light to pass through, as a complete rotation of 4×90° and thus a completely symmetrical or best possible overlap of the bundles of light beams 7 or a good mutual equalization of any possible remaining irregularities in the distribution of light of the bundle of light beams 7 from various apertures for light to pass through 4 is thus achieved. As FIG. 5 demonstrates, in the case of a multi-row or multi-column matrix along a diagonal, an angle of rotation of 180° may be advantageous for achieving the best possible homogenization. Unlike the depiction in FIG. 5, it may also be advantageous if such a 180° rotation is provided along both diagonals, i.e. from top left to bottom right and from bottom left to top right.

In the case of an array of four light sources, with two sets of pairs of light sources 2a and 2b per aperture for light to pass through 4, see FIG. 6, an angle of rotation of 90° between two adjacent apertures for light to pass through 4 of a row of apertures for light to pass through and/or an angle of rotation of 90° between two adjacent apertures for light to pass through of a column of apertures for light to pass through 4 and/or an angle of rotation of 180° between two apertures for light to pass through 4 of a diagonal line of apertures for light to pass through 4 or preferably along both diagonals may be provided, see FIG. 6. This may be in particular in the case of a matrix array of at least 2×2 apertures for light to pass through 4, each of which is allocated the aforementioned pair group of 2×2 light sources 2a and 2b or an array of four light sources.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A lighting apparatus with a perforated panel having at least one aperture for light to pass through and a lens arranged so as to be concealed behind the perforated panel to emit a bundle of light beams that narrows on its way from the lens to the perforated panel, passes through the aperture for light to pass through, and broadens again after leaving the perforated panel;
   wherein a plurality of light sources are allocated to the lens, the light from which light sources is captured by the lens and emitted in the form of the bundle of light beams, where the lens is shaped in such a manner that a direct light portion emitted without reflection from the lens and an indirect light portion emitted with reflection from the lens have substantially identical beam angles, and each substantially completely fill out the overall bundle of light beams emitted by the lens.

2. The lighting apparatus of claim 1, wherein each of the plurality of light sources have either or both different luminous colors and different color temperatures.

3. The lighting apparatus of claim 1, wherein each of the plurality of light sources are embodied as one of red, green, blue, and white.

4. The lighting apparatus of claim 1, wherein the plurality of light sources comprise at least two different white color temperatures selected from the group consisting of warm white, cold white, and neutral white.

5. The lighting apparatus of claim 1 further comprising a control apparatus for variably controlling the output ratio of the plurality of light sources, being one or both of the color temperature and brightness of the total bundle of light beams emitted from the lens.

6. The lighting apparatus of claim 1, wherein the beam angles of the direct and indirect light portions of the bundle of light beams are between from approximately 2×10° to 2×50°.

7. The lighting apparatus of claim 6, wherein the beam angles of the direct and indirect light portions of the bundle of light beams are approximately 2×35°.

8. The lighting apparatus of claim 1, wherein the lens has a constriction ratio of approximately 1.4 to 2.5, wherein the constriction ratio reflects the ratio of the diameter of the bundle of light beams at the light emitting surface of the lens to the minimum diameter of the bundle of light beams in the region of the aperture for light to pass through of the perforated panel.

9. The lighting apparatus of claim 1, wherein a plurality of apertures for light to pass through are provided a distance from one another, where a lens is allocated to each of the apertures for light to pass through, to each of which in turn a plurality of light sources are allocated, where the light sources at a first aperture for light to pass through are positioned in a different arrangement than the light sources at a second aperture for light to pass through.

10. The lighting apparatus of claim 9, wherein the arrays of light sources at adjacent apertures for light to pass through are turned toward one another.

11. The lighting apparatus of claim 10, wherein the rotation of the array of light sources in each case with regard to a hole axis passing through the aperture for light to pass through is provided.

12. The lighting apparatus of claim 10, wherein the arrays of light sources at each aperture for light to pass through are rotated by a predetermined angle.

13. The lighting apparatus of claim 12, wherein for an array of two light sources with two light sources per aperture for light to pass through and for an array of four light sources with four light sources per aperture for light to pass through, an angle of rotation of 90° between two adjacent apertures for light to pass through of a row or column of apertures for light to pass through and an angle of rotation of 180° between two apertures for light to pass through of a diagonal line of apertures for light to pass through is provided.

14. A lighting apparatus comprising:
a perforated panel with an aperture;
a lens having a light emitting side; and
a light source;
wherein light from the light source can pass through the aperture of the perforated panel;
wherein light passing through the aperture of the perforated panel comprises an indirect light portion and a direct light portion, the indirect light portion being light from the light source reflected from the light emitting side of the lens, and the direct light portion being light from the light source without reflection from the light emitting side of the lens;
wherein the lens is shaped such that the indirect light portion beam angle is substantially equal to the direct light portion beam angle; and
wherein the lens is shaped such that the indirect light portion and the direct light portion substantially fill out the overall light from the lens.

15. The lighting apparatus of claim 14, wherein the lens has a constriction ratio of between approximately 1.4 to 2.5;
wherein the constriction ratio is a ratio of the diameter of light beams from the light emitting side of the lens to a minimum diameter of light beams in the region of the aperture of the perforated panel.

16. The lighting apparatus of claim 14 further comprising one or more additional light sources.

17. The lighting apparatus of claim 16, wherein each light source is of a different luminous color from another.

18. The lighting apparatus of claim 16, wherein each light source is of a different color temperature from another.

19. The lighting apparatus of claim 16, wherein each light source is selected from the group consisting of a red, green, blue, and white light source.

20. The lighting apparatus of claim 16 further comprising a control apparatus for variably controlling the light sources.

21. The lighting apparatus of claim 20, wherein the control apparatus variably controls one or more characteristics of the light sources selected from the group consisting of the color temperature of the light sources and the brightness of the light sources.

22. A lighting apparatus comprising:
a perforated panel with a plurality of apertures;
a plurality of lenses, each having a light emitting side, wherein one lens is allocated to each aperture; and
a plurality of light sources allocated to each lens;
wherein light from the plurality of light sources can pass through the respective allocated aperture of the perforated panel;
wherein light passing through each aperture of the perforated panel comprises an indirect light portion and a direct light portion, the indirect light portion being light from the plurality of light sources reflected from the light emitting side of the lens, and the direct light portion being light from the plurality of light sources without reflection from the light emitting side of the lens;
wherein each lens is shaped such that the indirect light portion beam angle is substantially equal to the direct light portion beam angle; and
wherein each lens is shaped such that the indirect light portion and the direct light portion substantially fill out the overall light from each lens.

* * * * *